3,843,390
COATED POLYCARBONATES

George A. Hudson, Venetia, and Joseph M. Rich, Pittsburgh, Pa., assignors to Baychem Corporation, New York, N.Y.
No Drawing. Filed Apr. 19, 1972, Ser. No. 245,605
Int. Cl. B32b 27/14
U.S. Cl. 117—138.8 F                                 5 Claims

ABSTRACT OF THE DISCLOSURE

Coated polycarbonates are provided which have as a surface layer thereon a coating containing (1) from about 5 to about 62 percent by weight of the coating of a linear diol, (2) from about 8 to about 35 percent by weight of the coating of a thermosetting acrylic comprising about 10 percent by weight of the acrylic of an unsaturated carboxylic acid, from about 4 to about 10 percent by weight of the acrylic of an hydroxyalkyl ester of an alpha, beta-unsaturated carboxylic acid, with the remainder comprising at least one alkyl ester of an alpha, beta-ethylenically unsaturated carboxylic acid and (3) from about 17 to about 87 percent by weight of the coating of a cross-linking agent.

---

Thermoplastic polycarbonates are commercially important materials which find utility in many diverse applications as a result of their excellent physical and chemical properties. Indeed polycarbonates are useful in a whole range of applications from paints, lacquers and threads to foils, films and shaped objects that can withstand the impact of a bullet without shattering. Unfortunately, however, because polycarbonate surfaces have little or no scratch resistance and are susceptible to attack by common solvents, their full commercial exploitation has been impeded.

Some attempts have been made to overcome this deficiency with little or no commercial success. Previous efforts have either required complicated lamination procedures or the application of some kind of surface layer which invariably adversely affected the polymer by stress cracking and crazing it, by causing crack propogation into the polycarbonate as a result of brittleness of the coating itself and/or by reducing the properties of the polymer generally such as, for example, impact resistance, elongation, tensile strength and so on.

It is therefore an object of this invention to provide a coated polycarbonate which is devoid of the foregoing disadvantages.

Another object of this invention is to provide polycarbonates which have scratch resistant coatings thereon which are not brittle, do not cause crack propogation into the polymer, are highly flexible and do not degrade the mechanical properties of the polymer.

A further object of this invention is to provide polycarbonates which have chemical and hydrolysis resistant surfaces.

A still further object of this invention is to provide coatings for polycarbonates which exhibit excellent adhesion to the polymer and which are easily applied.

Yet another object of this invention is to provide coatings for polycarbonates which are flexible and which will not cause stress cracking and crazing of the polymer nor reduce the mechanical properties of the polymer such as, for example, the impact strength, elongation and tensile strength.

The foregoing objects and others which will become apparent from the following description are accomplished in accordance with this invention, generally speaking, by providing a polycarbonate surface having as a coating thereon a composition containing (1) from about 5 to about 62 percent by weight of the composition of a linear diol, (2) from about 8 to about 35 percent by weight of the composition of a thermosetting acrylic comprising about 10 percent by weight of the acrylic of an unsaturated carboxylic acid, from about 4 to about 10 percent by weight of the acrylic of an hydroxyalkyl ester of an alpha.beta-unsaturated carboxylic acid with the remainder comprising at least one alkyl ester of an alpha,beta-ethylenically unsaturated carboxylic acid such as an alkyl acrylate and/or an alkyl methacrylate and (3) from about 17 to about 87 percent by weight of the composition of a crosslinking agent, preferably hexamethoxymethylmelamine. The preferred thermosetting acrylic (2) comprises (a) from about 50 to about 53 percent by weight of the acrylic of ethyl acrylate, (b) from about 30 to about 34 percent by weight of the acrylic of methyl methacrylate, (c) about 10 percent by weight of the acrylic of acrylic acid and from about 4 to about 10 percent by weight of the acrylic of 3-hydroxyphenyl methacrylate.

In a preferred method of preparing the coated polycarbonate surface of this invention, a mixture of components (1), (2) and (3) in a solvent system that will not stress crack or craze a polycarbonate sheet or a polycarbonate molded article when tested according to American Standards Association test, 5.20.1 to 5.20.3 at 1,000 p.s.i. stress level, preferably a mixture of butanol, Cello-Solve (2-ethoxyethanol) and toluol is prepared which mixture contains any catalyst conventionally used to cure melamine systems, preferably an acid, a weak salt of an acid or a combination of an acid and a weak salt thereof. This composition may also include an ultraviolet stabilizer to protect the polycarbonate from the degradative effects of sun and weather and the use of such an agent is preferred. Optionally, a flow agent may be incorporated in the formulation. The resulting composition may then be applied to any polycarbonate surface by any method familiar in the art including spraying, dip coating, curtain coating, flow coating or any other suitable industrial method.

The most preferred formulation to be employed in the practice of this invention comprises a polycaprolactone polyester as the linear diol (1), a copolymer of ethyl acrylate, methyl metacrylate, acrylic acid and 3-hydroxypropyl methacrylate as the thermosetting acrylic (2), hexamethoxymethylmelamine as the crosslinking agent (3), p-toluene sulfonic acid and the n-ethylmorpholine salt of p-toluene sulfonic acid as the catalyst, p-methoxy benzilidene malonic acid diethyl ester as an ultraviolet stabilizer and a silicone flow agent to improve flow and slip and a solvent system of Cello-Solve, toluol and butanol.

Unexpectedly, it has been found that formulations within the narrow limits set out above and only those formulations provide a polycarbonate surface with adequate scratch resistance, hydrolysis resistance, chemical resistance, flexibility and so on while at the same time allowing the polymer to retain, undegraded, the highly desirable physical and chemical properties by which it is distinguished. Furthermore, it was extremely unexpected that any acrylic formulation could be employed with advantage in thus treating polycarbonate surfaces since acrylic coatings are well known to possess certain negative properties that would lead one to expect that their use could only detract from the appearance and properties of the polycarbonate per se. For example, compositions comprising acrylic polymers and melamine resins usually exhibit excessive cold-cracking and lowered humidity resistance, less than optimum adhesion properties, and even poor retention of gloss in many circumstances. It was therefore highly unexpected that the particular formulation of this invention would exhibit excellent adhesion to polycarbonate substrates and yield high gloss surfaces resistant to scratching, weathering, effects of humidity, chemicals including solvents and moisture in general while at the same time having no stress cracking, crazing or crack propogation effect on the polymer or other deleterious effects on the properties of the polycarbonate per se.

In the preparation of the coating compositions of this invention, any suitable linear diol may be employed. Generally, however, the linear diol is a linear polyester having an OH equivalent weight of from about 50 to about 600 or a mixture of linear polyesters having an average OH equivalent weight of from about 50 to about 600. Preferably, saturated linear diols are employed although unsaturated linear diols may also be used as desired.

Some suitable polyesters which may be used in the practice of this invention include, for example, those described in U.S. Pats. 3,201,372; 3,523,101; 3,245,956 and the like including polyesters obtained from polycarboxylic acids such as, for example, oxalic acid, malonic acid, succinic acid, glutaric acid, adipic acid, methyladipic acid, pimelic acid, suberic acid, azelaic acid, brassylic acid, sebacic acid, thapsic acid, amleic acid, fumaric acid, glutaconic acid, alphahydromuconic acid, isophthalic acid, terepthalic acid, mellophanic acid, prehnitic acid and the like and any suitable polyhydric alcohol such as, for example, ethylene glycol, 1,3-propylene glycol, 1,2-butylene glycol, 1,3-butylene glycol, 1,4-butylene glycol, 1,5-pentane diol neopentyl glycol, 1,6-heptane diol, 1,7-heptane diol, 1,20-eicosanyl diol and the like and mixtures thereof. The most preferred types of polyesters, however, are polycaprolactone polyesters including, for example, those disclosed in U.S. Pats. 2,914,556; 2,933,477; 3,169,945; 3,186,971; 3,190,858; 3,224,982; 3,240,730; 3,523,101 and the like. Generally, lactone polyesters are prepared from a lactone using an initiator having at least one reactive hydrogen atom capable of opening the lactone ring, with or without the aid of a catalyst, and adding it as an open chain without forming water of condensation. Any lactone starting material may be used, but preferably lactones having at least five carbon atoms in the ring and at least one hydrogen substituent on the carbon atom attached to the oxy group in the ring are employed. Any active hydrogen containing initiator can be used, but preferably polyols or alcohols, amino alcohols, polycarboxylic acids, hydroxy carboxylic acids and so on are used as discussed and exemplified in the patents cited herein.

The thermosetting acrylic component of the coating composition of this invention can be prepared from any suitable alkyl ester of an alpha,beta-ethylenically unsaturated carboxylic acid such as an alkyl acrylate or an alkyl methacrylate. The alkyl acrylates and methacrylates generally employed include the normal and iso ethyl, methyl propyl, butyl hexyl, ethylhexyl, lauryl and the like acrylates and methacrylates as well as similar esters having up to about 20 carbon atoms in the alkyl chain.

The unsaturated carboxylic acid component of the coating of this invention is preferably acrylic acid or methacrylic acid, although other acids such as crotonic acid, cinnamic acid, atropic acid, alpha-chloroacrylic acid, alpha-fluoroacrylic acid, maleic acid, fumaric acid, monoisopropyl maleate, mono-n-butyl fumarate, itaconic acid and their anhydrides may also be employed.

Any hydroxyalkyl ester of an unsaturated carboxylic acid can be used in preparing the thermosetting acrylic polymer of this invention but preferably, alkylene glycol monoesters in which the alkylene moiety contains up to about 12 carbon atoms are employed. Some suitable hydroxyalkyl esters include the acrylic and metacrylic acid monoesters of ethylene glycol, 1,2-propylene glycol, 1,3-propylene glycol, 1,4-butylene glycol, 1,10-dodecylene glycol and the like but polyhydroxyalkyl esters such as 2,3-dihydroxypropyl acrylate, 6,10-dihydroxydecyl methacrylate and the like can be utilized also. One may also employ similar esters of other unsaturated acids such as, for example, those having up to about 6 carbon atoms and including unsaturated dicarboxylic acids such as those listed herein including maleic acid, fumaric acid, itaconic acid and their anhydrides.

The crosslinking component of the coating composition of this invention is an amine-aldehyde resin, i.e., an aldehyde condensation product of melamine, urea, acetoguanamine or a similar compound. Generally, the aldehyde employed is formaldehyde, although the products can be made from other aldehydes, such as acetaldehyde, crotonaldehyde, acrolein, benzaldehyde, furfural and others. While resins produced from melamine or urea are most common and are preferred, condensation products of other amines and amides can also be employed, for example, those of triazines, diazines, triazoles, guanidines, guanamines and alkyl and aryl substituted derivatives of such compounds including alkyl and aryl substituted ureas and alkyl and aryl substituted melamine provided at least one amino group is present. Some examples of such compounds are N,N'-dimethylurea, benzylurea, dicyandiamide, formoguanamine, benzoguanamine, ammeline, 2-chloro-4,6-diamino-1,3,5-triazine, 6-methyl-2,4-diamino-1,3,5-triazine, 2-phenyl-4 - amino - 6 - hydroxy-1,3,5-triazine, 3,5-diaminotriazole, triaminopyrimidine, 2-mercapto-4,6-diaminopyrimidine, 2,4,6-trihydrazine-1,2,5-triazine, 2,4,6-triethyltriamino - 1,3,5 - triazine, 2,4,6-triphenyltriamino-1,3,5-triazine and the like.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol and other alkanols, usually having up to about 12 carbon atoms, as well as benzyl alcohol and other aromatic alcohols; cyclic alcohols such as cyclohexanol; monoethers of glycols such as the Cello-Solves and Carbitols and halogen-substituted or other substituted alcohols such as 3-chloropropanol.

The amine-aldehyde resin is produced in a manner well known in the art using acidic or basic catalyst and varying conditions of time and temperature in accordance with conventional practice. The formaldehyde is often employed as a solution in water or alcohol and the condensation etherification and polymerization reactions may be carried out either sequentially or simultaneously.

In a preferred method for preparing the coated polycarbonate of this invention, the mixture of components (1), (2) and (3) is applied to the polycarbonate in a solvent system that will not stress crack or craze a polycarbonate sheet or a polycarbonate molded article when tested under the conditions of the American Standards Association 26.1 test paragraph 5.20.1 to 5.20.3. While the preferred solvent system is a mixture of butanol, Cello-Solve and toluol at a 5:2:3 ratio, it is to be understood that other ratios and any solvent or mixture of solvents which will not stress cack or craze a polycarbonate under the conditions specified herein may be employed. Thus, a single solvent alone may be employed or a mixture of solvents may be used even though one or more of the solvents in the mixture may, when tested alone, fail the specified test. Accordingly, it can be appreciated that the term solvent as used herein encompasses both solvents and non-solvents for the polycarbonate, either per se or in mixtures, which functions as solvents for the mixture of components (1), (2) and (3). Any desired solvent or mixture thereof as specified herein can be employed including, for example, aliphatic hydrocarbons, aromatic hydrocarbons, silicones, mineral spirits, chlorinated aliphatic and aromatic hydrocarbons, ethers, esters, ketones, alcohols, water and the like. Examples of some such suitable materials include isobutylene, pentane, hexane, heptane, octane, methylcyclohexane, turpentine, cyclohexane, dipentene, ethylbenzene, xylene, toluene, benzene, tetralin, 2,2-dichloropropane, carbon tetrachloride, 1,2-dichloropropane, chloroform, trichloroethylene, tetrachloroethylene, chlorobenzene, methylene chloride, ethylene dichloride, o-dichlorobenzene, diethyl ether, dimethyl ether, dichloroethyl ether, dioxane, isobutyl-n-butyrate, isopropyl isobutyrate, methyl amyl acetate, butyl butyrate, sec. butyl acetate, sec. amyl acetate, isobutyl acetate, isopropyl acetate, amyl acetate, butyl acetate, Cello-Solve acetate, propyl acetate, butyl Cello-Solve, ethyl acetate, propyl formate, dibutyl phthalate, methyl acetate, ethyl lactate, butyronitrile, acetonitrile, propylene carbonate, ethylene carbonate, diisobutyl ketone, diisopropyl ketone, methyl isobutyl ketone, methyl amyl ketone, methyl propyl ketone, diethyl ketone, isophorone, diacetone alcohol, methyl cyclohexanone, methyl ethyl ketone, cyclohexanone, acetone, cyclopentanone, cyclobutandione, butyl Carbitol, butyl Cello-Solve, diethylene glycol, 2-ethylene glycol, Carbitol, Cello-Solve, methyl isobutyl carbinol, n-octanol, 2-ethyl butanol, n-hexanol, sec.-butanol, n-pentanol, n-butanol, cyclohexanol, isopropanol, n-propanol, ethanol, ethylene glycol, methanol, glycerol, and the like and mixtures thereof. Other suitable solvents within the scope of the definition set forth herein which may also be employed alone or in admixture as required are exemplified in Solubility Parameters for Fi'm Formers, *Official Digest*, October 1955, pp. 726-758. Generally, the ketones, acetates and aromatic hydrocarbons are used only in admixture with compounds that act as weaker solvents for the polycarbonate and are employed to improve the bite into the surface where required.

Any suitable ultraviolet stabilizer may be used in the preferred embodiment of this invention at any concentration effective to protect the polycarbonate from the degradative effects of light but preferably, a sufficient quantity should be employed to provide the polycarbonate surface with at least 0.4 gram, most preferably from about 3 to about 30 grams of the ultraviolet stabilizer per square meter of surface of the polycarbonate. Any suitable ultraviolet absorber may be used, such as, for example benzophenone derivatives including 2,2'-dihydroxybenzophenone;
2,2'4,4'-tetrahydroxybenzophenone;
2,2'-dihydroxy-4,4'-dimethoxybenzophenone;
2,2'-dihydroxy-4,4'-diethoxybenzophenone;
2,2'-dihydroxy-4,4'-dipropoxybenzophenone;
2,2'-dihydroxy-4,4'-dibutoxybenzophenone;
2,2'-dihydroxy-4-methoxy-4'-ethoxybenzophenone;
2,2'-dihydroxy-4-methoxy-4'-propoxybenzophenone;
2,2'-dihydroxy-4-methoxy-4'-butoxybenzophenone;
2,2'-dihydroxy-4-ethoxy-4'-propoxybenzophenone;
2,2'-dihydroxy-4-ethoxy-4'-butoxybenzophenone;
2,3'-dihydroxy-4,4'-dimethoxybenzophenone;
2,3'-dihydroxy-4-methoxy-4'-butoxybenzophenone;
2-hydroxy-4,4',5'-trimethoxybenzophenone;
2-hydroxy-4,4',6'-tributoxybenzophenone;
2-hydroxy-4-butoxy-4',5'-dimethoxybenzophenone;
2-hydroxy-4-ethoxy-2',4'-dibutylbenzophenone;
2-hydroxy-4-propoxy-4',6'-dichlorobenzophenone;
2-hydroxy-4-propoxy-4',6'-dibromobenzophenone;
2,4-dihydroxybenzophenone;
2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4'-5'-trimethoxybenzophenone;
2-hydroxy-4-ethoxy-4'-methylbenzophenone;
2-hydroxy-4-ethoxy-4-'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone, and the like. Any suitable benzotriazole derivatives may also be employed including 2-(2'-hydroxy-5'-methylphenyl)-benzotriazole,
2-(2'-hydroxy-5'-*tert*.-butylphenyl)benzotriazole,
2-(2'-hydroxy-3'-methyl-5'-*tert*.-butylphenyl)-benzotriazole,
2-(2'-hydroxy-5'-cyclohexylphenyl)-benzotriazole,
2-(2'-hydroxy-3',5'-dimethylphenyl)-benzotriazole,
2-(2'-hydroxy-5'-*tert*.-butylphenyl)-5-chlorobenzotriazole,
2-(2'-hydroxy-3'-di-*tert*.-butylphenyl)-benzotriazole and derivatives of crotonic acid such as *a*-cyano-*b*-methyl-*b*-(*p*-methoxyphenyl)-crotonic acid methyl ester, *a*-cyano-*b*-N-(2-methyl-indolinyl-crotonic acid methyl ester, substituted acrylates such as 2 ethyl-hexyl-2-cyano-3,3-diphenyl acrylate as well as malonic acid esters such as, for example, the dimethyl, diethyl, dipropyl and the like esters of malonic acid and the like and mixtures thereof. It is to be understood that any ultraviolet absorber may be used in the practice of this invention and that any one or combination of absorbers can be used.

The coating compositions of this invention preferably contain a flow agent and/or a slip agent to improve the flow and slip, most preferably a silicone or polysiloxane slip and/or flow agent. Any suitable slip and flow agents may be employed including silicone oils as described in U.S. Pats. 2,834,748 and 3,201,372 or any other such agents including sulfonated castor oil, polydimethyl siloxanes and the like. The preferred amount of such agents range from about 0.1 to 1 percent by weight based on the weight of the solids in the coating composition.

The coating compositions of this invention may also contain other additives such as pigments, antioxidants and fillers as desired. The pigments may be of any conventional type and may include metallic pigments which produce a polychromatic finish. The coating compositions of this invention can be applied to the polycarbonate surface by any conventional techniques as discussed hereinbefore and then baked to provide a hard, glossy coating. Typical baking schedules are a function of catalyst type and amount and range from 1 to 60 minutes at temperatures not in excess of 275° F. In some cases, it is desirable to cure the compositions at somewhat lower temperatures, such as 150° F. This can be done by the addition of an acid catalyst and heating at 150° F. to 275° F. for 1 to 60 minutes. Essentially any acid which is soluble in hydrocarbons can be employed for this purpose, the amount added being generally between about 0.3 percent and about 10 percent by weight based on the vehicle resin solids. Smaller amounts of acid catalyst are sometimes added even when curing at higher temperatures is contemplated.

The preferred catalysts are alkyl acid phosphates, such as monomethyl acid phosphate, monoethyl acid phosphate, monopropyl acid phosphate and monobutyl acid phosphate, as well as the corresponding dialkyl compounds, such as dibutyl acid phosphate. A mixture of mono- and dialkyl phosphates is often utilized. In addition to the alkyl acid phosphates, examples of other acid catalysts which can be used include phosphoric acid, maleic acid and anhydride, fumaric acid, chloromaleic acid and anhydride, alkyl acid phthalates such as methyl, ethyl, propyl and butyl acid phthalates, monoalkyl succinates and maleates such as methyl, ethyl, propyl and butyl succinates and maleates and others having sufficient solubility to permit them to be dissolved in the coating composition at the desired proportion. Catalysts which have been found to be particularly suitable are compounds such as the sulfonic acids and derivatives thereof including, for example, p-toluene sulfonic acid, methyl-p-sulfonic acid and the like.

The surface of any polycarbonate or polycarbonate blend may be treated with the coating composition of this invention. The polycarbonate or polycarbonate blend can be prepared by any suitable process including those outlined in U.S. Pats. 3,028,365; 2,999,846; 3,248,414; 3,153,008; 3,215,668; 3,187,065; 2,964,974; 2,970,137; 2,991,273; 2,999,835; 3,014,891; 3,030,331; 3,431,224; 3,290,412 and the like.

The unexpected advantages of this invention will be further illustrated by reference to the following examples in which all parts and percentages are by weight unless otherwise specified. As the examples graphically illustrate, it is the coating compositions described herein and only those compositions which function as adequate coatings for polycarbonates. Other coatings, although represented to be scratch resistant, even other acrylic coatings having compositions similar to those of the coatings of the instant invention, are not satisfactory.

EXAMPLE 1

An illustrative thermosetting acrylic was prepared using a solvent system of 50 parts of 1,4-dioxane, 25 parts of isopropanol and 25 parts of ethylene glycol monoether ether (Cello-Solve). In this example, wherever solvent is mentioned, the above-described mixture is intended. A monomer solution of 83.3 grams of ethyl acrylate, 50 grams of methyl methacrylate, 16.7 grams of acrylic acid, 16.7 grams of 2-hydroxypropyl methacrylate and 1.3 grams of 1-dodecanethiol in 90 grams of solvent was charged into a 300 ml. addition funnel. A solution of 8.3 grams of benzoyl peroxide in 55 grams of 1,4-dioxane was charged into a 125 ml. addition funnel. The reactor consists of a two liter reaction kettle equipped with a water cooled reflux condensor, mechanical stirrer, thermometer, a nitrogen inlet and the two addition funnels containing the monomer solution and the benzoyl peroxide solution, respectively.

About 125 ml. of the monomer solution were charged into the reaction flask and heated under a nitrogen blanket to 80° C. with stirring. About 15 ml. of the benzoyl peroxide solution were added and the temperature began to rise. The reaction mixture was maintained at from about 75° to about 85° C. by heating and cooling as required. After about 10 minutes an additional 10 ml. of the benzoyl peroxide solution were added. After another 20 minutes, an additional 20 ml. of monomer solution were added as well as about 10 ml. of benzoyl peroxide solution. After a further 10 minutes, another 20 ml. of monomer solution were added and another 10 ml. of benzoyl peroxide solution. Following 15 more minutes, about 30 ml. of monomer solution were added followed by the slow addition of the remainder of the benzoyl peroxide solution. The temperature rose to about 92° C. and was maintained at about 97° C. while the remainder of the monomer solution was added dropwise. The reaction mixture was maintained at about 98° C. for about five hours with stirring under a nitrogen blanket, following which the reaction mixture was poured into wide mouth bottles and placed in a water bath to cool.

The thermosetting acrylic thus prepared has a Brookfield viscosity at 25° C. of 2,152 cps., a saponification number of 209, an acid number of 75, an hydroxyl number of 36 and a percent solids content of 56.

In the following experiments which were carried out using a thermosetting acrylic as described above, the following tests were employed:

Cross-hatch adhesion test.—A cured coated surface is cross-hatched with a scalpel (1/16" side on square) and adhesive tape is applied to the cross-hatched surface. The number of cross-hatched squares which remain on the surface after the adhesive tape is pulled off indicates the percentage of adhesion of the coating to the surface.

Rubber abrasion test.—A common pencil eraser is rubbed several times across a cured coated surface. Where severe abrasions occur, the coating fails; where little abrasion occurs, the coating passes. This is a rapid screening test, the results of which correlate extremely well with the results obtained via other tests.

Slip.—A coin is placed on a flat cured coated surface which is then raised at an angle until the angle is reached at which the coin begins to slide and that angle is recorded. The minimum angle of slip is 45°. This is an excellent test for determining resistance to dirt pick-up and dragging during cleaning operations.

Impact resistance-Gardner impact test.—A coating is rapidly distended by dropping a known weight through a known distance onto a cured coated sample, causing a deep hemispherical indentation. Impact values are reported as inch-pounds of impact that the coated sample will withstand without cracking or separation from the substrate.

Taber Abrasion.—American Standards Association test 26.1, paragraph 5.17 was used. The maximum allowable change in haze is 15%. A cured coated sample is subject to 100 revolutions on a Taber Abraser using CS–10F wheels under a constant load of 500 grams.

Solvent resistance-toluene is added dropwise to a cured coated surface until a ½ inch diameter circle of solvent is obtained. The degree of softening of the coating is noted.

EXAMPLE 2

About 100 parts of a thermosetting acrylic as described in Example 1, 11 parts of hexamethoxymethylmelamine, 54 parts of ethylene glycol monoethyl ether and 0.7 part of para-toluene sulfonic acid were all mixed together. The resulting coating composition was then applied using a draw down bar to the surface of a polycarbonate prepared as described in Example 1 of U.S. Pat. 3,640,951 and formed into a ⅛ inch sheet. The coating was then cured for about 30 minutes at a temperature of 250° F. The resulting one mil thick coating showed poor adhesion in the cross-hatch adhesion test and could be easily abraded in the rubber abrasion test. Accordingly, since the coating did not even pass the minimum tests, it was considered a complete failure.

EXAMPLE 3

About 100 parts of a linear polycaprolactone polyester diol having a weight average molecular weight of 530 and an average hydroxyl number of 212, 30 parts of hexamethoxymethylmelamine, 130 parts of ethylene glycol monoethyl ether and 1.3 parts of p-toluene sulfonic acid were all mixed together and resulting coating composition was applied at a thickness of one mil as described in Example 1 to the polycarbonate substrate described in Example 1. The resulting cured coating passed the rubber abrasion test but exhibited no adhesion in the cross-hatch adhesion test and failed the slip test. Since the coating could not even adhere to the substrate, it was considered a complete failure.

EXAMPLE 4

The polycaprolactone polyester described in Example 3 was mixed together with a thermosetting acrylic as described in Example 1, hexamethoxymethylmelamine (HMMM), p-toluene sulfonic acid (p-TSA) and 1:1 mixture of toluene and ethylene glycol monoethyl ether (T/EGME) in the ratios specified as follows:

|         | A    | B    | C    | D    |
|---------|------|------|------|------|
| Polyester | 20   | 40   | 60   | 80   |
| Acrylic | 80   | 60   | 40   | 20   |
| HMMM    | 18   | 21   | 24   | 27   |
| p-TSA   | 0.8  | 1.0  | 1.1  | 1.2  |
| T/EGME  | 82   | 94   | 106  | 118  |

A one mil thick film was applied to the polycarbonate surface described in Example 2 in the manner described in Example 2. The following test results were observed:

|                          | A         | B          | C          | D         |
|--------------------------|-----------|------------|------------|-----------|
| Cross-hatch adhesion     | 100%      | 100%       | 100%       | 0%.       |
| Rubber abrasion resistance | Very poor | Excellent  | Excellent  | Very good. |
| Slip                     | 30        | 30         | 30         | 80.       |
| Taber abrasion           | Fail      | Pass       | Pass       | Pass.     |
| Impact (inch-pounds)     | >160      | >160       | >160       | >160.     |

While coating A exhibited good adhesion, slip and impact, the coating was easily scratched and failed both abrasion tests thus rendering it unsuitable as a commercially acceptable polycarbonate coating. On the other hand, the coating D passed the abrasion tests but failed to adhere to the substrate and failed the slip test. Coating B and C, however, passed all tests including solvent resistance.

EXAMPLE 5

About 10 parts of the polycaprolactone polyester described in Example 3, 23 parts of an acrylic as described in Example 1, 11 parts of hexamethoxymethylmelamine, 16 parts of ethylene glycol monomethyl ether, 8 parts of toluene, 30 parts of n-butanol, 0.1 part of a polysiloxane flow aid and 1.7 parts of p-methoxybenzylidene malonic acid diethyl ester were mixed together. A one mil thick coating was applied to the polycarbonate surface described in Example 2 in the manner described in Example 2. The resulting coating exhibited 100% adhesion, a very good abrasion resistance of less than 5% in the Taber Abrasion test, good chemical resistance and excellent resistance to rubber abrasion. The coated surface also passed the slip test and withstood 160 inch pounds on the impact test.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Coated polycarbonate having as a surface layer a coating containing (1) from about 5 to about 62 percent by weight of the coating of a linear diol, (2) from about 8 to about 35 percent by weight of the coating of a thermosetting acrylic containing about 10 percent by weight of the acrylic of an unsaturated carboxylic acid, from about 4 to about 10 percent by weight of the acrylic of any hydroxyalkyl ester of an alpha,beta-unsaturated carboxylic acid with the remainder comprising at least one alkyl ester of an alpha,beta-ethylenically unsaturated carboxylic acid and (3) from about 17 to about 87 percent by weight of the coating of a crosslinking agent.

2. The coated polycarbonate of Claim 1 wherein the thermosetting acrylic contains from about 50 to about 55 percent by weight of the acrylic of ethyl acrylate, from 30 to about 34 percent by weight of the acrylic of methyl methacrylate, about 10 percent by weight of the acrylic of acrylic acid and from about 4 to about 10 percent by weight of the acrylic of 3-hydroxypropyl methacrylate.

3. The coated polycarbonate of Claim 1 wherein the linear diol is a polycaprolactone polyester.

4. The coated polycarbonate of Claim 1 wherein the crosslinking agent is hexamethoxymethylmelamine.

5. The coated polycarbonate of Claim 1 wherein the coating contains an ultraviolet stabilizer for the polycarbonate.

References Cited

UNITED STATES PATENTS

| 3,382,294 | 5/1968 | Christenson et al. | 260—856   |
| 3,582,398 | 6/1971 | Ringler            | 117—138.8 |
| 3,672,944 | 6/1972 | Thompson et al.    | 117—138.8 |
| 3,673,148 | 6/1972 | Vasta et al.       | 260—856   |

WILLIAM D. MARTIN, Primary Examiner

S. L. CHILDS, Assistant Examiner

U.S. Cl. X.R.

117—33.3; 260—856, 873